United States Patent Office 2,939,870
Patented June 7, 1960

2,939,870

DERIVATIVES OF DIBENZO-CYCLOHEPTADIENE AND A PROCESS OF PREPARING SAME

Georges Muller, Nogent-sur-Marne, France, Bruno Vaterlaus, Basel, Switzerland, and Leon Velluz, Paris, France, assignors to UCLAF, Paris, France, a French body corporate No Drawing. Filed June 16, 1958, Ser. No. 742,044

Claims priority, application France June 28, 1957

2 Claims. (Cl. 260—326.5)

This invention relates to derivatives of dibenzocycloheptadiene and to a method of preparing same, and more particularly the present invention relates to a method of preparing new derivatives of 4,5-6,7-dibenzo $\Delta^{4,6}$-cycloheptadiene, I, resulting from a transformation of thiocolchicine and having an activity similar to that of colchicine.

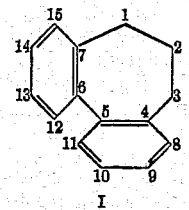

I

This application is a continuation-in-part application of our co-pending application Serial No. 669,468, filed on July 2, 1957, and entitled "Derivatives of Dibenzo Cycloheptadiene and a Method of Preparing Same," now Patent No. 2,911,411.

In copending patent application Serial No. 486,036 of February 3, 1955, now Patent No. 2,820,029, the applicant describes the preparation of thiocolchine, II,

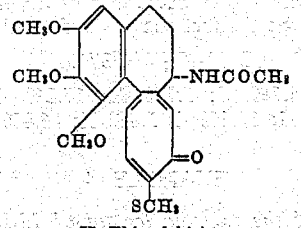

II. Thiocolchicine by the action of methyl mercaptan on colchicine. It was believed in the past that only those derivatives of colchicine which had preserved a tropolonic structure were capable of exerting the activity of the starting product.

It has now been found that certain derivatives of dibenzo-cycloheptadiene, I, and, in particular, the lactam of 12,13,14-trimethoxy-9-methyl thio-3α-amino-4,8-dihydro - 4,5-6,7 - dibenzo - $\Delta^{4,6}$ - cycloheptadiene - 8α - carboxylic acid

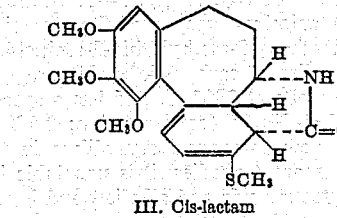

III. Cis-lactam referred to as "cis-lactam" hereinafter, and the racemic mixture of said cis lactam with the corresponding isomeric compound, said racemic mixture being referred to as "racemic lactam" hereinafter, as well as the lactam of 12,13,14 - trimethoxy - 9 - methyl thio - 3α - amino-4,5-6,7 - dibenzo - $\Delta^{4,6}$ - cycloheptadiene - 8 - carboxylic acid,

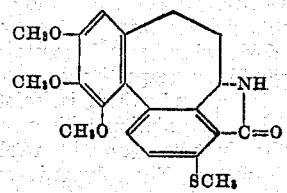

IV. Aromatic lactam referred to as "aromatic lactam" hereinafter, and the racemic mixture of said lactam with the corresponding 3β-isomeric compound, said racemic mixture being referred to as "racemic aromatic lactam" hereinafter, and, furthermore, the racemic mixture of the lactam of 12, 13,14 - trimethoxy - 3 - amino - 4,5-6,7 - dibenzo - $\Delta^{4,6}$-cycloheptadiene-8-carboxylic acid

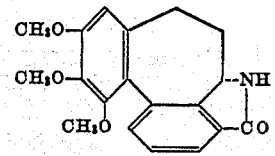

V. Desulfurized lactam referred to as "desulfurized lactam" hereinafter, have an activity similar to that of colchicine for research work in plant genetics.

In order to prepare the "cis-lactam," identified as III hereinabove, the process of the present invention provides that an alkaline salt of methyl mercaptan is caused to react, in an anhydrous medium, with thiocolchicine, referred to by Formula II hereinabove, at room temperature. This produces a mixture of products from which the lactam of the Formula III is isolated, which is then transformed by the action of alkalies into the aromatic lactam, hereinabove illustrated by Formula IV.

In order to prepare the "racemic lactam" another embodiment of the present invention provides that an alkali metal alcoholate is caused to react, in an anhydrous medium, with thiocolchicine of Formula II at an elevated temperature. Thereby a mixture of products is produced from which the "racemic lactam" is isolated, which is then transformed into the "racemic aromatic lactam" by the action of alkalies.

The "desulfurized lactam," identified by Formula V given hereinabove, is produced according to the present invention by splitting off the methyl mercapto group by means of Raney-nickel in an alcoholic solution.

For carrying out the process of preparing the "cis-lactam" according to the present invention, it is sufficient to prepare a solution of sodium or potassium methyl mercaptide in a suitable anhydrous solvent such as methanol, which can be done easily by introducing a stream of methyl mercaptan into anhydrous methanol, wherein the desired quantity of sodium or potassium metal has previously been dissolved. The thiocolchicine, II, is dissolved in the solution prepared in this manner, which is then allowed to stand at room temperature for two or three days. After dilution with water, the compound is taken up with a solvent which is not miscible with water, such as chloroform, dichloro ethane, or ether, and the organic solvent layer is washed with water. After the organic phase has been dried and the solvent has been evaporated, the "cis-lactam," III, is isolated by chromatography.

The corresponding "racemic lactam" is obtained by boiling a solution of thiocolchicine in absolute alcohol in the presence of an alkali metal alcoholate, for instance, by boiling thiocolchicine in absolute methanol in the presence of sodium methylate.

The "cis-lactam," III, or the corresponding "racemic lactam" is subjected in a water-alcohol solution or in an aqueous alcohol-tetrahydrofurane solution to the action of sodium or potassium hydroxide at room temperature for about 2–3 days, whereby it becomes aromatic and forms compound IV, or, respectively, the corresponding "racemic aromatic lactam," which is isolated and purified by neutralizing the solution with a mineral or organic acid and then by extraction with a solvent which is not miscible with water. The solvent is evaporated and the resulting residue produces, by means of crystallization, the desired pure aromatic lactam, IV, or, respectively, the corresponding "racemic aromatic lactam." As stated above, desulfurization is effected by a treatment with Raney-nickel in an alcoholic medium whereby the lactam of 12,13,14-trimethoxy-3-amino-4,5-6,7-dibenzo cycloheptadiene-8-carboxylic acid is obtained.

The following examples serve to illustrate the present invention without, however, limiting the same thereto. The melting points given herein are instantaneous melting points determined on the Maquenne block.

EXAMPLE 1

*Preparation of the lactam of 12,13,14-trimethoxy-9-methyl thio-3α-amino-4,8-dihydro-4,5-6,7-dibenzo-Δ$^{4,6}$-cycloheptadiene-8α-carboxylic acid, III, ("cis-lactam")*

10 g. of thiocolchicine are dissolved in 60 cc. of anhydrous methanol containing 5.4 g. of the sodium salt of methyl mercaptan. The solution is then allowed to stand at room temperature for three days. 200 cc. of chloroform are added, and the solution is washed with water, dried over magnesium sulfate, and evaporated to dryness in a vacuum. The residue which weighs 9.1 g. is taken up with 200 cc. of chloroform, and the resulting solution is treater chromatographically over 300 g. of neutral aluminum oxide.

Elution of the residue is carried out as follows: The first 300 cc. of chloroform are evaporated to dryness and yield 3.05 g. of a product which, when recrystallized in ethyl acetate, produces 1.9 g. of the methyl ester of colchicic acid. The following 1250 cc. of chloroform permit the recovery of 2.7 g. of unchanged starting thiocolchicine. Finally, 1250 cc. of chloroform with 1% ethanol yield 4.3 g. of a product which is subjected to fractional crystallization, first in ethyl acetate and then in ethanol. Thereby, the desired cis-lactam III, melting point about 258° C. or higher, $[\alpha]_D^{20}=-415° \pm 20$ (c=0.5%, chloroform) is obtained in the form of yellow crystals, which are insoluble in water, ether, petroleum ether, slightly soluble in ethyl acetate, and soluble in chloroform.

The infra-red spectrum reveals the presence of a 1.688 cm.$^{-1}$ band, which is characteristic of a γ-lactam.

Analysis of the product shows the formula of $$C_{20}H_{23}O_4NS=373.5$$

Calculated: 64.3% C; 6.2% H; 17.1% O; 3.8% N; 8.6% S. Found: 64.6% C; 6.3% H; 17.3% O; 3.8% N; 8.3% S.

EXAMPLE 2

*Preparation of the racemic lactam of 12,13,14-trimethoxy-9-methyl thio-3-amino-4,8-dihydro-4,5-6,7-dibenzo-Δ$^{4,6}$-cycloheptadiene-8-carboxylic acid ("racemic lactam")*

2 g. of thiocolchicine are dissolved in 40 cc. of anhydrous methanol containing 400 mg. of sodium metal. After refluxing for 3 hours, yellow crystals separate on cooling which are filtered with suction. Thereby, 170 mg. to 200 mg. of fine needles are obtained which have a specific rotatory power of $[\alpha]_D^{20}$ between $+5°$ and $+35° \pm 5°$ (concentration: 0.5% in chloroform). 

800 mg. of said compound in benezene/chloroform (1:1) are subjected to chromatographic absorption on aluminum oxide. The absorption agent is eluted by means of benzene/chloroform (1:1). After separation of 60 mg. of the methyl ester of colchicic acid melting at 250° C., crude "racemic lactam" is collected and recrystallized from absolute ethanol to remove the corresponding dextrorotatory isomeric compound. Thereby, 85 mg. of fine, slightly yellow needles which melt at 264–265° C. are obtained. The compound has a specific rotatory power of $[\alpha]_D^{20}=0°$ (concentration: 0.5% in chloroform), is insoluble in water, ether, benzene, dilute aqueous acids and alkalies, slightly soluble in acetone, and soluble in ethanol, chloroform, dimethyl formamide, and tetrahydrofurane.

Analysis.—$C_{20}H_{23}O_4NS=373.45$. Calculated: 64.32% C; 6.21% H; 17.14% O; 3.75% N; 8.58% S. Found: 64.5% C; 6.3% H; 17.2% O; 3.9% N; 8.5% S.

This compound has not yet been described in the literature.

EXAMPLE 3

*Preparation of the lactam of 12,13,14-trimethoxy-9-methyl thio - 3α-amino-4,5-6,7-dibenzo - Δ$^{4,6}$-cycloheptadiene-8-carboxylic acid, IV ("aromatic lactam")*

250 mg. of the "cis-lactam" compound, III, prepared according to Example 1, are dissolved in 45 cc. of ethanol, 5 cc. of 10 N aqueous sodium hydroxide solution are added, and the solution is allowed to stand at room temperature for two days. The resulting solution is neutralized with aqueous hydrochloric acid; extraction is carried out with chloroform, and the chloroform layer is decanted and dried over magnesium sulfate. Filtration and evaporation of the solvent produces the crude aromatic lactam IV, which is recrystallized from aqueous ethanol.

The above procedure yields 145 mg. of pure aromatic lactam, IV, melting point $+252°$ C., $[\alpha]_D^{20}=+85°$ (c=0.5%, chloroform). The product is colorless, insoluble in water and petroleum ether, soluble in chloroform and ethanol. 

The infra-red spectrum reveals the presence of a 1.692 cm.$^{-1}$ band, which is characteristic of a γ-lactam.

Analysis of the product shows the formula of $$C_{20}H_{21}O_4NS=371.4$$

Calculated: 64.7% C; 5.7% H; 17.2% O; 3.8% N; 8.6% S. Found: 64.6% C; 5.8% H; 16.8% O; 3.7% N; 8.2% S.

EXAMPLE 4

*Preparation of the racemic lactam of 12,13,14-trimethoxy-9-methyl thio-3-amino-4,5-6,7-dibenzo-Δ$^{4,6}$-cycloheptadiene-8-carboxylic acid ("racemic aromatic lactam")*

160 mg. of the "racemic lactam" compound prepared according to Example 2, are dissolved by gentle heating in 20 cc. of tetrahydrofurane. A mixture of 20 cc. of ethanol and 5 cc. of a pure sodium hydroxide solution are added thereto. The mixture is stirred at room temperature for three days and diluted with water. The precipitated crystals are separated and recrystallized from absolute ethanol. Thereby, 73 mg. (46% of the theoretical amount) of colorless crystals of the racemic lactam of 12,13,14-trimethoxy-9-methyl thio-3-amino-4,5-6,7-dibenzo-cycloheptadiene-8-carboxylic acid are obtained. The compound melts at 290° C. and has a specific rotatory power of $[\alpha]_D^{20}=0°$ (concentration: 0.5% in chloroform). The new compound crystallizes in the form of fine and transparent needles, it is unsoluble in water, ether, dilute aqueous acids and alkalies, and is soluble in alcohol, acetone, and chloroform.

Analysis.—$C_{20}H_{21}O_4NS=371.44$. Calculated: 64.66% C; 5.69% H; 17.23% O; 3.77% N; 8.63% S. Found: 64.8% C; 5.8% H; 17.2% O; 3.6% N; 8.3% S.

EXAMPLE 5

*Preparation of the racemic lactam of 12,13,14-trimethoxy - 3 - amino-4,5-6,7-dibenzo-$\Delta^{4,6}$-cycloheptadiene-8-carboxylic acid, V ("desulfurized lactam")*

130 mg. of the "racemic aromatic lactam" prepared according to Example 4, are dissolved in 50 cc. of anhydrous ethanol. 0.8 cc. of a suspension of Raney-nickel containing 1% of palladium (manufactured by the firm "Degussa") are washed with alcohol and added. After refluxing for 5 hours, the mixture is filtered over a filter aid (hypercel). The filtrate is evaporated to dryness. The residue is recrystallized from methanol. 75 mg. (66% of the theoretical amount) of colorless and transparent fine needles are obtained which melt at 215° C. and have a specific rotatory power of $[\alpha]_D^{20}=0°$ (concentration: 0.5% in chloroform). The compound is insoluble in water, dilute aqueous acids and alkalies, slightly soluble in ether, and soluble in alcohol, benzene, and chloroform.

*Analysis.*—$C_{13}H_{13}O_4N=325.35$. Calculated: 70.14% C; 5.89% H; 19.67% O; 4.31% N. Found: 70.0% C; 5.9% H; 20.1% O; 4.4% N.

This product has not yet been described in the literature.

The new compounds are used in the biological and industrial field for the same purpose for which colchicine is used, particularly for the modification of kariokynesis and the production of polyploids, and are administered either by spreading aqueous solutions or suspensions thereof on cultivated soil, or by treating seeds in undiluted form therewith or with solutions of said compounds in a suitable solvent or with dusting powders containing said compounds deposited on a suitable carrier. Solutions of said compounds with concentrations between 0.1% and 2% have proved to be of great value in the treatment of seeds to produce polyploidism without, however, being limited thereto. Cultivated soil may also be sprayed with such solutions.

Of course, many changes and variations in the starting materials, the reaction components, the reaction conditions, temperature, and duration, the mode of working up the reaction products and of isolating and purifying the same may be made by those skilled in the art in accordance with the principles set forth herein and in the claims annexed thereto.

We claim:

1. The racemic lactam of 12,13,14-trimethoxy-3-amino - 4,5 - 6,7 - dibenzo - $\Delta^{4,6}$ - cycloheptadiene - 8-carboxylic acid.

2. In a process of preparing the lactam of 12,13,14-trimethoxy - 3 - amino - 4,5 - 6,7 - dibenzo - $\Delta^{4,6}$ - cycloheptadiene-8-carboxylic acid of the formula

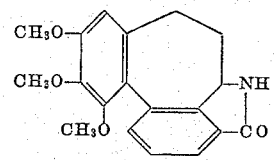

the step which consists in exchanging the 9-methyl thio group of the lactam of 12,13,14-trimethoxy-9-methyl thio - 3 - amino - 4,5 - 6,7 - dibenzo - $\Delta_{4,6}$ - cycloheptadiene-8-carboxylic acid by hydrogen by treating said compound with Raney nickel in the presence of an alcohol.

References Cited in the file of this patent

UNITED STATES PATENTS 2,911,411    Muller et al. _____ Nov. 3, 1959